(12) United States Patent
Chen et al.

(10) Patent No.: US 11,320,114 B2
(45) Date of Patent: May 3, 2022

(54) LIGHT SOURCE MODULE

(71) Applicant: Coretronic Corporation, Hsin-Chu (TW)

(72) Inventors: Sung-Lien Chen, Hsin-Chu (TW); Chen-Wei Fan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/087,509

(22) Filed: Nov. 2, 2020

(65) Prior Publication Data

US 2021/0148544 A1    May 20, 2021

(30) Foreign Application Priority Data

Nov. 14, 2019  (CN) .......................... 201921961978.9

(51) Int. Cl.
| | |
|---|---|
| *F21V 5/00* | (2018.01) |
| *F21V 7/05* | (2006.01) |
| *F21V 14/08* | (2006.01) |
| *F21V 14/04* | (2006.01) |
| *F21V 3/00* | (2015.01) |
| *F21V 3/06* | (2018.01) |

(Continued)

(52) U.S. Cl.
CPC ................. *F21V 7/05* (2013.01); *F21V 3/00* (2013.01); *F21V 14/04* (2013.01); *F21V 14/08* (2013.01); *F21S 10/007* (2013.01); *F21V 3/0615* (2018.02); *F21V 3/0625* (2018.02); *F21V 13/04* (2013.01); *F21V 13/06* (2013.01); *F21V 13/12* (2013.01)

(58) Field of Classification Search
CPC .......... F21S 10/007; F21V 7/05; F21V 13/04; F21V 13/06; F21V 13/12; F21V 13/10; F21V 14/04; F21V 14/08; F21V 17/02; F21V 3/0615; F21V 3/0625; F21V 9/40; G03B 21/2066
See application file for complete search history.

(56) References Cited

U.S. PATENT DOCUMENTS

| | | | | |
|---|---|---|---|---|
| 4,148,549 | A | * | 4/1979 | Termanis ................ G03F 7/001 359/35 |
| 4,325,637 | A | * | 4/1982 | Moore ............... G01B 11/2441 101/401.1 |

(Continued)

FOREIGN PATENT DOCUMENTS

| | | |
|---|---|---|
| CN | 210199482 | 3/2020 |
| TW | 201514604 | 4/2015 |

*Primary Examiner* — Y M. Quach Lee
(74) *Attorney, Agent, or Firm* — JCIPRNET

(57) ABSTRACT

A light source module includes a light source, first and second lens elements, a reflector, and a first diffuser. The light source emits a beam focused by the first lens element on a first focal point. The reflector is disposed on a beam transmission path. The first lens element is between the light source and the reflector. The first diffuser is between the first lens element and the reflector and includes a first diffusion plate and a first drive mechanism. The first diffusion plate is at/near the first focal point. The beam is transmitted to the reflector by the first diffusion plate. The first drive mechanism is between the first diffusion plate and the first lens element, and moves/rotates the first diffusion plate. The second lens element has a second focal point, coinciding with the first focal point, at a light-incident side. The reflector is at the light-incident side.

15 Claims, 6 Drawing Sheets

(51) Int. Cl.
    *F21V 13/04*     (2006.01)
    *F21S 10/00*     (2006.01)
    *F21V 13/06*     (2006.01)
    *F21V 13/12*     (2006.01)

(56) References Cited

U.S. PATENT DOCUMENTS

| | | | |
|---|---|---|---|
| 2014/0247429 A1* | 9/2014 | Ogino | G03B 21/2066 362/84 |
| 2016/0097494 A1* | 4/2016 | Su | F21V 14/04 362/84 |

* cited by examiner

LIGHT SOURCE MODULE

CROSS-REFERENCE TO RELATED APPLICATION

This application claims the priority benefit of China application serial no. 201921961978.9, filed on Nov. 14, 2019. The entirety of the above-mentioned patent application is hereby incorporated by reference herein and made a part of this specification.

BACKGROUND OF THE INVENTION

1. Field of the Invention

The invention relates to an optical system, and in particular, to a light source module.

2. Description of Related Art

Projectors have been used as a common means for presenting information in people's daily life. In recent years, the emergence of portable projection apparatuses makes the use more convenient and satisfies use requirements in various scenarios. For the purpose of miniaturization, projection apparatuses of this kind are generally provided with a reflection element to increase the overall design margin of optical path. Meanwhile, to provide a uniform illumination light source, a diffuser is disposed on a transmission path of a light beam emitted from a light source, and such a diffuser is usually implemented by using a rotation wheel. That is, such a projection apparatus further requires a drive element driving the diffuser to rotate, such as a motor. Although the size of a motor can be scaled down to as small as 20 millimeters, it still takes up a certain layout space so as not to structurally interfere with other components (for example, the adjusting mechanism of the reflection element). As a result, it becomes challenging in miniaturizing an optical system.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a light source module, which achieves better uniformity of an illumination light beam and a larger design margin of a reflector.

An embodiment of the invention provides a light source module to achieve one or all of the foregoing objectives or other objectives. The light source module includes a light source, a first lens element, a reflector, a first diffuser, and a second lens element. The light source is configured to emit a light beam. The first lens element is configured to focus the light beam on a first focal point. The reflector is disposed on a transmission path of the light beam, and the first lens element is located between the light source and the reflector. The first diffuser is disposed between the first lens element and the reflector. The first diffuser includes a first diffusion plate and a first drive mechanism. The first diffusion plate is located at the first focal point or near the first focal point. The light beam is transmitted to the reflector by the first diffusion plate. The first drive mechanism is disposed between the first diffusion plate and the first lens element, and is configured to drive the first diffusion plate to move or rotate. The second lens element is provided with a second focal point located at a light-incident side. The reflector is located at the light-incident side, and the second focal point coincides with the first focal point.

Based on the foregoing, in the light source module according to an embodiment of the invention, the diffuser is disposed between the reflector and the light source, and a drive mechanism configured to drive the diffuser to move or rotate is disposed at a side of the diffusion plate away from the reflector, so that the layout space of the reflector is increased, thereby increasing the design margin of the light source module. In addition, the diffusion plate is disposed at or near the focal points of the two lens elements, which helps to scale down the size of the diffusion plate.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
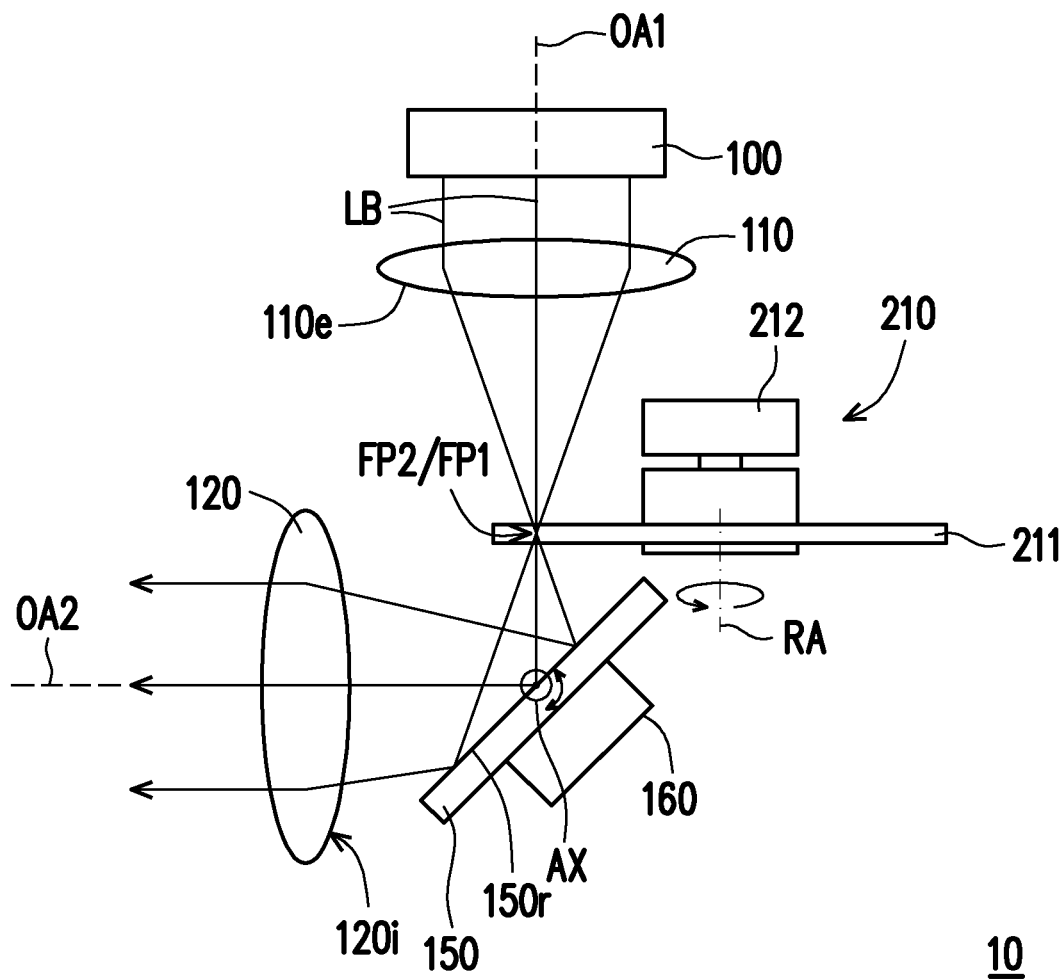
FIG. 1 is a schematic side view of a light source module according to a first embodiment of the invention.

FIG. 1 is a schematic side view of a light source module according to a first embodiment of the invention. Referring to FIG. 1, a light source module 10 includes a light source 100, a first lens element 110, a reflector 150, and a first diffuser 210. The light source 100 is configured to emit a plurality of light beams LB. In the present embodiment, for example, the light source 100 is a semiconductor laser diode or a light source array formed by semiconductor laser diodes, but the invention is not limited thereto. In other embodiments, the light source 100 may be a light emitting diode. The first lens element 110 is configured to converge these light beams LB on a first focal point FP1 at a light exiting side 110e of the first lens element 110. The reflector 150 is disposed on a transmission path of these light beams LB, and the first lens element 110 is located between the light source 100 and the reflector 150. The first diffuser 210 is disposed between the first lens element 110 and the reflector 150, and includes a first diffusion plate 211 and a first drive mechanism 212. In the present embodiment, the first drive mechanism 212 is configured to drive the first diffusion plate 211 to rotate relative to a rotation axis RA of the first diffuser 210, but the invention is not limited thereto. For example, the first drive mechanism 212 of the first diffuser 210 is a motor or an actuator, but the invention is not limited thereto.

In the present embodiment, the light source module 10 may further include an adjusting mechanism 160. The reflector 150 is disposed at the adjusting mechanism 160, and the adjusting mechanism 160 is configured to drive the reflector 150 to rotate or move relative to at least one axis AX. For example, under the drive of the adjusting mechanism 160, the reflector 150 is rotatable relative to the axis AX or movable along an axial direction of the axis AX. That is, the reflector 150 in the present embodiment is adjustable in two dimensions, but the invention is not limited thereto. In other embodiments, the reflector 150 is further rotatable or movable relative to another axis, to satisfy the requirement of four-dimensional adjustment. It is to be noted that, both an optical axis OA1 of the first lens element 110 and an optical axis OA2 of a second lens element 120 intersect with the axis AX of the reflector 150. That is, both the optical axis OA1 of the first lens element 110 and the optical axis OA2 of the second lens element 120 pass through the axis AX of the reflector 150.

It is to be noted that, mechanism interference between the first drive mechanism 212 and the reflector 150 or the adjusting mechanism 160 can be reduced by disposing the first drive mechanism 212 between the first diffusion plate 211 and the first lens element 110. This helps improve the design margin of the reflector 150, for example, tolerance of the size of the reflector and the adjustable range of the reflective surface.

In addition, in the present embodiment, the first diffusion plate 211 is optionally located at the first focal point FP1 of the first lens element 110, but the invention is not limited thereto. In other embodiments, the first diffusion plate 211 is disposed near the first focal point FP1 of the first lens element 110, for example, within a range of 5 millimeters away from the first focal point FP1. Specifically, the light beams LB are focused on the first diffusion plate 211 after passing through the first lens element 110, and are transmitted to the reflector 150 by the first diffusion plate 211. Specifically, the light beams LB are transmitted to the reflector 150 after passing through the first diffusion plate 211, but the invention is not limited thereto. For example, in other embodiment, the light beams LB are transmitted to the reflector 150 after reflecting from the first diffusion plate 211. A speckle phenomenon of laser light beams is effectively suppressed by means of the rotation of the first diffusion plate 211 relative to the rotation axis RA, thereby improving the uniformity of light emitted by the light source module 10.

Furthermore, the light source module 10 further includes the second lens element 120. The second lens element 120 is provided with a second focal point FP2 located at a light-incident side 120i, and the reflector 150 is located at the light-incident side 120i of the second lens element 120. In the present embodiment, the optical axis of the second lens element 120 intersects the optical axis of the first lens element 110, and an intersection of the two optical axes is located at a reflective surface 150r of the reflector 150. Specifically, the light beams LB from the first diffusion plate 211 are incident on the second lens element 120 after being reflected by the reflective surface 150r. It is to be particularly noted that, the second focal point FP2 of the second lens element 120 coincides with the first focal point FP1 of the first lens element 110. That is, the first lens element 110 and the second lens element 120 are confocal. It is to be noted that, in the present embodiment, plane shapes of the two lens elements at the light-incident side and the light exiting side respectively being symmetrical is used as an example for description, which does not mean that the invention is limited by the content in the accompanying drawings of the disclosure. According to other embodiments, the plane shapes of the lens element at the light-incident side and the light exiting side may be implemented in an asymmetrical form, that is, the lens element may have different focal lengths at the light-incident side and the light exiting side.

Other embodiments will be listed below to describe the disclosure in detail, where the same components are labeled with the same symbols and the description of the same technical content is omitted. Please refer to the foregoing embodiments for the omitted part, and details are not described in the following again.

Figure 2:
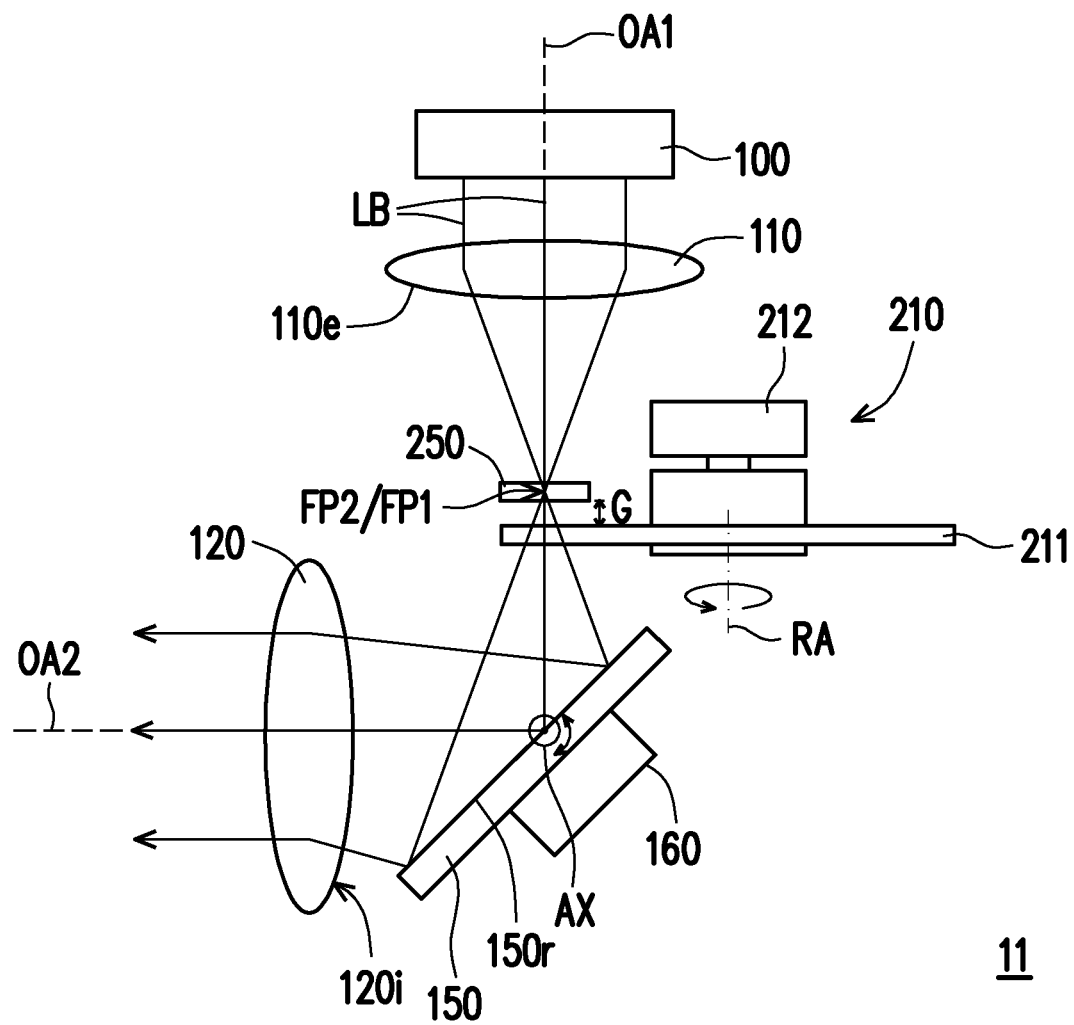
FIG. 2 is a schematic side view of a light source module according to a second embodiment of the invention.

FIG. 2 is a schematic side view of a light source module according to a second embodiment of the invention. Referring to FIG. 2, a main difference between a light source module 11 in the present embodiment and the light source module 10 in FIG. 1 is that: the light source module 11 is further provided with a fixed diffuser 250 on the transmission path of the light beams LB. In the present embodiment, the fixed diffuser 250 is disposed at the first focal point FP1 of the first lens element 110, and the first diffusion plate 211 is disposed near the first focal point FP1, for example, within a range of 5 millimeters away from the first focal point FP1. To be more specific, the fixed diffuser 250 is spaced apart from the first diffusion plate 211. In the present embodiment, there is a gap G between the fixed diffuser 250 and the first diffusion plate 211, and the gap G is greater than or equal to 2 millimeters to avoid interference between the fixed diffuser 250 and the first diffusion plate 211.

In the present embodiment, the fixed diffuser 250 is optionally disposed between the first diffusion plate 211 and the first lens element 110, but the invention is not limited thereto. In other embodiments, the fixed diffuser 250 is disposed between the first diffusion plate 211 and the reflector 150. It is to be noted that, the first diffusion plate 211 of the first diffuser 210 is rotatable relative to the rotation axis RA. However, the fixed diffuser 250 is fixedly disposed on the transmission path of the light beams LB. The fixed diffuser 250 is disposed at the first focal point FP1 of the first lens element 110, so that a size of the fixed diffuser 250 can be further reduced.

In addition, the fixed diffuser 250 and the first diffusion plate 211 are capable of producing diffusive angles α and β for collimated light beams respectively. Therefore, the light beams LB are provided with a diffusive angle of $(\alpha^2+\beta^2)^{1/2}$ by the fixed diffuser 250 and the first diffusion plate 211 sequentially. Specifically, the light beams LB are provided with a diffusive angle of $(\alpha^2+\beta^2)^{1/2}$ after passing through the fixed diffuser 250 and the first diffusion plate 211 sequentially, but the invention is not limited thereto. For example, in other embodiment, the light beams LB are provided with a diffusive angle of $(\alpha^2+\beta^2)^{1/2}$ after reflecting from the fixed diffuser 250 and the first diffusion plate 211 sequentially. In other words, the speckle phenomenon of the laser light beams can be further effectively eliminated by the adjacent fixed diffuser 250 and first diffusion plate 211 that are spaced apart, thereby improving the uniformity of light emitted by the light source module 11.

Figure 3:
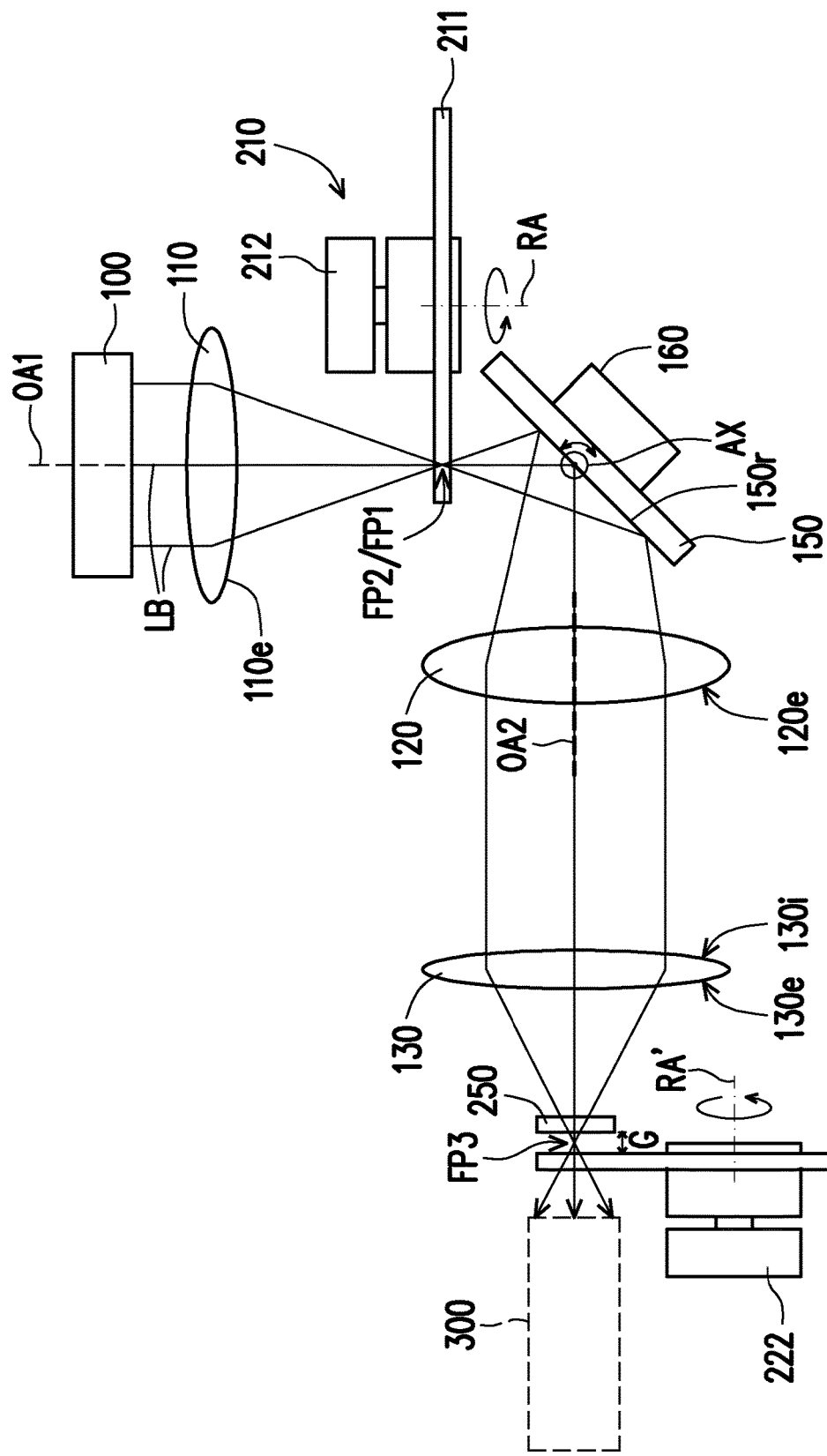
FIG. 3 is a schematic side view of a light source module according to a third embodiment of the invention.

FIG. 3 is a schematic side view of a light source module according to a third embodiment of the invention. Referring to FIG. 3, a main difference between a light source module 12 in the present embodiment and the light source module 10 in FIG. 1 is that: the light source module 12 is provided with a third lens element 130, a second diffuser 220, and a fixed diffuser 250 on the transmission path of the light beams LB. Specifically, the third lens element 130 is disposed at a light exiting side 120e of the second lens element 120, and is configured to converge the light beams LB from the second lens element 120 at a third focal point FP3 at a light exiting side 130e of the third lens element 130. The second diffuser 220 and the fixed diffuser 250 are disposed at the light exiting side 130e of the third lens element 130, and are near the third focal point FP3 of the third lens element 130, for example, within a range of 5 millimeters away from the third focal point FP3. To be more specific, the second diffuser 220 and the fixed diffuser 250 are located at two opposite sides of the third focal point FP3 of the third lens element 130, but are not limited thereto. According to other embodiments, the third focal point FP3 of the third lens element 130 optionally overlaps with the fixed diffuser 250 or the second diffuser 220. That is, one of the fixed diffuser 250 and the second diffuser 220 is disposed at the third focal point FP3 of the third lens element 130, and the other is disposed near the third focal point FP3.

Furthermore, the second diffuser 220 includes a second diffusion plate 221 and a second drive mechanism 222. The second diffusion plate 221 is spaced apart from the fixed diffuser 250. The second drive mechanism 222 is configured to drive the second diffusion plate 221 to rotate or move relative to a rotation axis RA' of the second diffuser 220, but the invention is not limited thereto. The second drive mechanism 222 of the second diffuser 220 is, for example, a motor or an actuator. In the present embodiment, there is a gap G between the fixed diffuser 250 and the second diffusion plate 221, and the gap G is greater than or equal to 2 millimeters to avoid interference between the fixed diffuser 250 and the second diffusion plate 221. In addition, the fixed diffuser 250 is optionally disposed between the second diffusion plate 221 and the third lens element 130, but the invention is not limited thereto. In other embodiments, the second diffusion plate 221 may also be disposed between the fixed diffuser 250 and the third lens element 130.

It is to be noted that, the second diffusion plate 221 of the second diffuser 220 is rotatable relative to the rotation axis RA'. However, the fixed diffuser 250 is fixedly disposed on the transmission path of the light beams LB. The fixed diffuser 250 is disposed near the third focal point FP3 of the third lens element 130, so that a size of the fixed diffuser 250 can be further reduced. In addition, the fixed diffuser 250, the first diffusion plate 211, and the second diffusion plate 221 are capable of producing diffusive angles α, β and γ for collimated light beams respectively. Therefore, the light beams LB are provided with a diffusive angle of $(\alpha^2+\beta^2+\gamma^2)^{1/2}$ by the first diffusion plate 211, the fixed diffuser 250, and the second diffusion plate 221 sequentially. Specifically, the light beams LB are provided with a diffusive angle of $(\alpha^2+\beta^2+\gamma^2)^{1/2}$ after passing through the first diffusion plate 211, the fixed diffuser 250, and the second diffusion plate 221 sequentially, but the invention is not limited thereto. For example, in other embodiment, the light beams LB are provided with a diffusive angle of $(\alpha^2+\beta^2+\gamma^2)^{1/2}$ after reflecting from the first diffusion plate 211, the fixed diffuser 250, and the second diffusion plate 221 sequentially. In other words, the speckle phenomenon of the laser light beams can be further effectively eliminated by the first diffusion plate 211 as well as the adjacent fixed diffuser 250 and second diffusion plate 221 that are spaced apart, thereby improving the uniformity of light emitted by the light source module 12.

For example, after passing through the second diffusion plate 221, the light beams LB may further enter an integration rod 300 to form a more uniform illumination light source, but the invention is not limited thereto. It is to be noted that, in the present embodiment, plane shapes of the third lens element 130 at a light-incident side 130i and the light exiting side 130e being symmetrical is used as an example for description, and it does not mean that the invention is limited by the content in the accompanying drawings of the disclosure. According to other embodiments, the plane shapes of the third lens element 130 at the light-incident side 130i and the light exiting side 130e may be implemented in an asymmetrical form, that is, the third lens element 130 may have different focal lengths at the light-incident side 130i and the light exiting side 130e.

Figure 4:
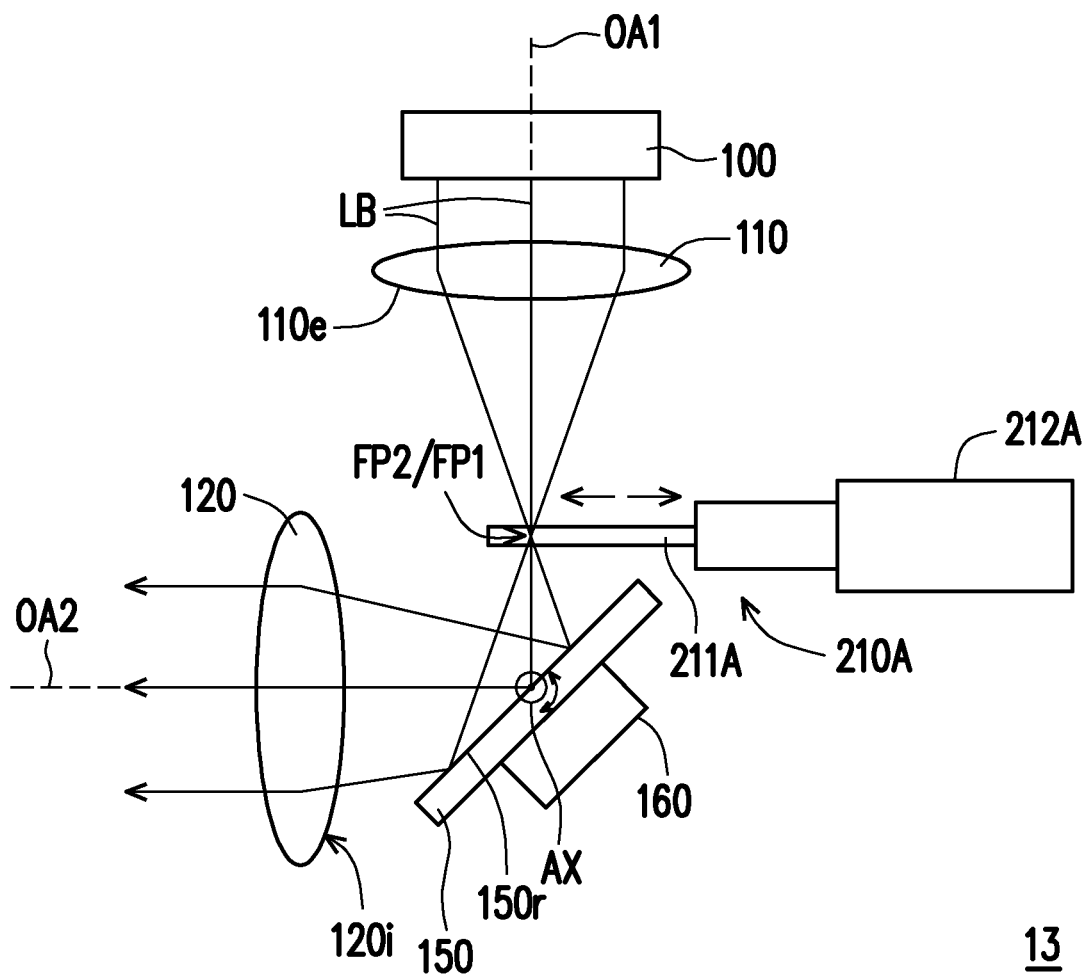
FIG. 4 is a schematic side view of a light source module according to a fourth embodiment of the invention.

FIG. 4 is a schematic side view of a light source module according to a fourth embodiment of the invention. Referring to FIG. 4, a main difference between a light source module 13 in the present embodiment and the light source module 10 in FIG. 1 is that: first diffusers are operated in different manners. Specifically, in the present embodiment, a first drive mechanism 212A of a first diffuser 210A is configured to drive a first diffusion plate 211A to move back and forth in a direction perpendicular to an axial direction of an optical axis OA of the first lens element 110, but the invention is not limited thereto. It is to be noted that, the speckle phenomenon of the laser light beams can be effectively eliminated by the first diffusion plate 211A moving back and forth in the direction perpendicular to the axial direction of the optical axis OA of the first lens element 110, thereby improving the uniformity of light emitted by the light source module 13.

Figure 5:
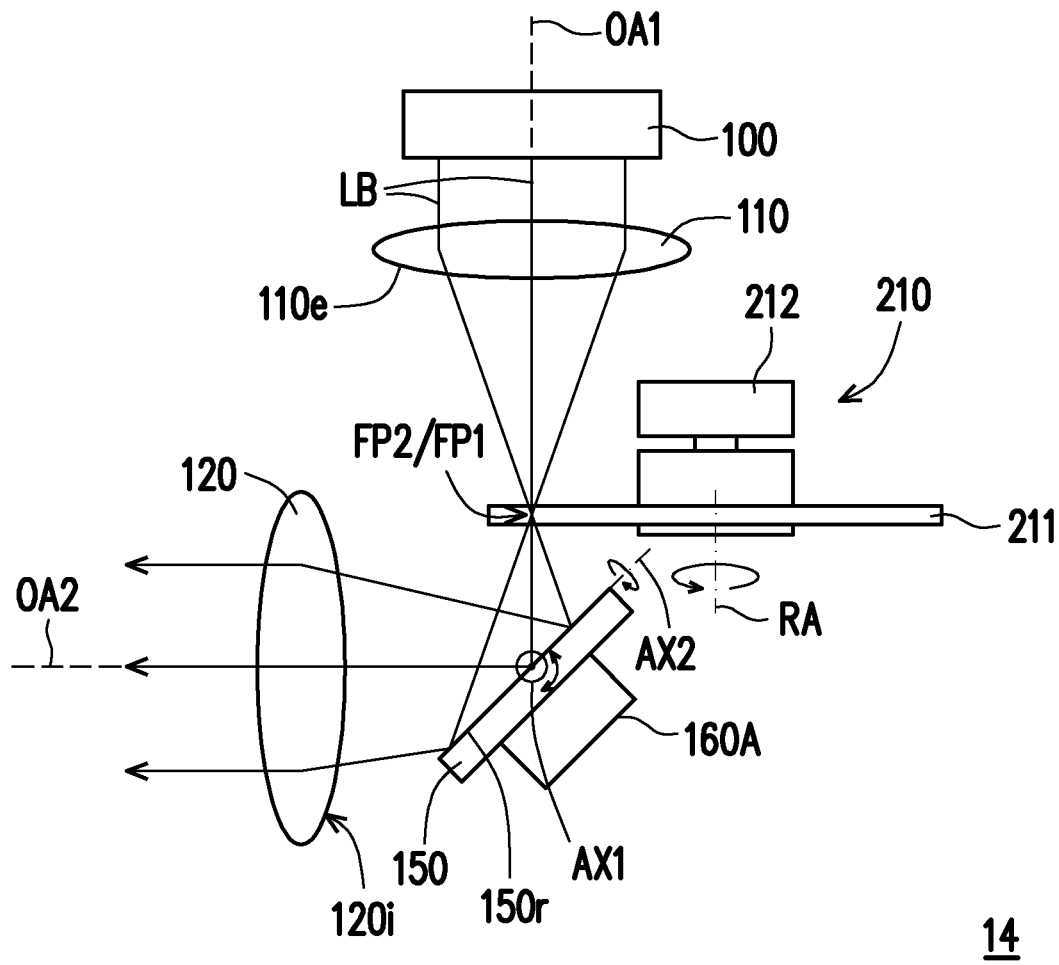
FIG. 5 is a schematic side view of a light source module according to a fifth embodiment of the invention.

FIG. 5 is a schematic side view of a light source module according to a fifth embodiment of the invention. Referring to FIG. 5, a main difference between a light source module 14 in the present embodiment and the light source module 10 in FIG. 1 is that: adjusting mechanisms operate in different manners. In the present embodiment, under the drive of an adjusting mechanism 160A, the reflector 150 rotatable relative to an axis AX1 and an axis AX2. It is to be noted that, the axis AX1 and the axis AX2 intersect at the optical axis OA1 of the first lens element 110, and also intersect at the optical axis OA2 of the second lens element 120. That is, both the optical axis OA1 of the first lens element 110 and the optical axis OA2 of the second lens element 120 pass through the intersection of the axis AX1 and the axis AX2. For example, in the present embodiment, an axial direction of the axis AX2 are optionally perpendicular to an axial direction of the axis AX1, but the invention is not limited thereto.

Figure 6:
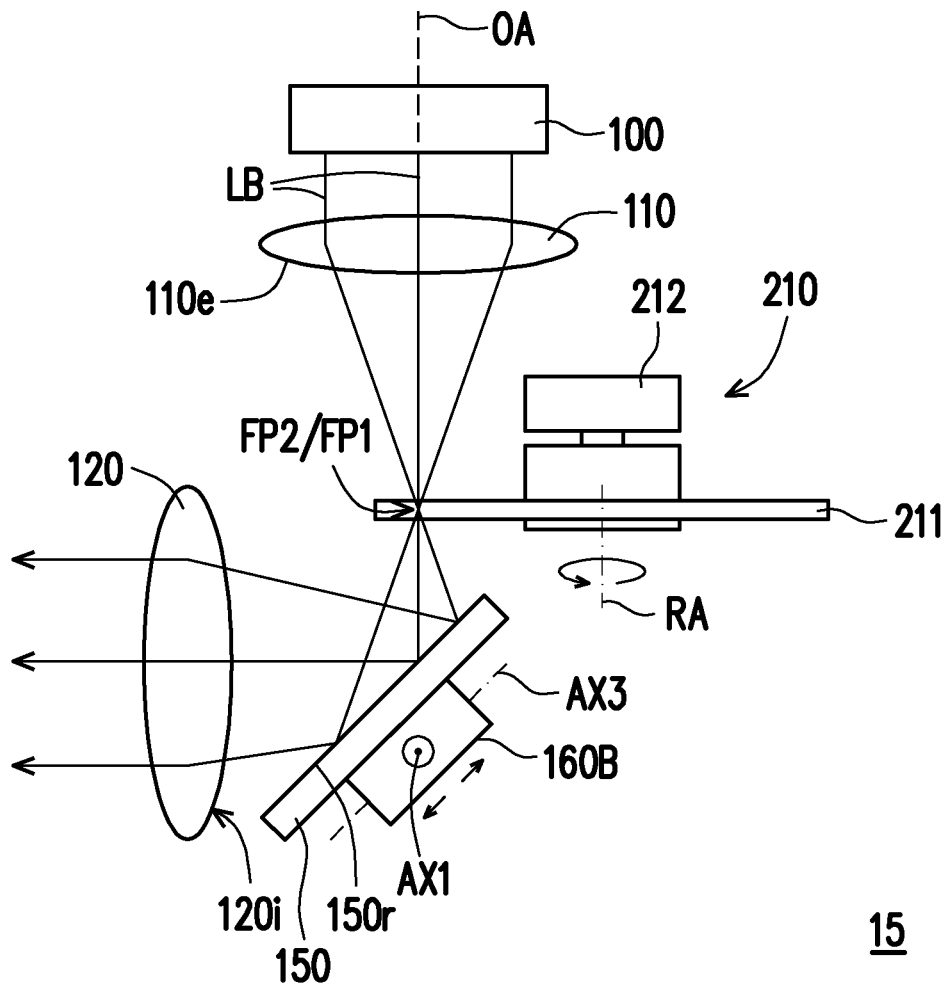
FIG. 6 is a schematic side view of a light source module according to a sixth embodiment of the invention.

FIG. 6 is a schematic side view of a light source module according to a sixth embodiment of the invention. Referring to FIG. 6, a main difference between a light source module 15 in the present embodiment and the light source module 10 in FIG. 1 is that: adjusting mechanisms operate in different manners. In the present embodiment, under the drive of an adjusting mechanism 160B, the reflector 150 movable along axial directions of the axis AX1 and an axis AX3, and the axial direction of the axis AX3 is optionally perpendicular to the axial direction of the axis AX1, but the invention is not limited thereto. In other embodiments, the axial direction of the axis AX3 may not be perpendicular to the axial direction of the axis AX1. For example, during adjustment, the reflector 150 may move along the axial direction of the axis AX1 or the axis AX3 first, and then move along the axial directions of the axis AX1 and the axis AX3 at the same time, but the invention is not limited thereto.

Based on the foregoing, in the light source module according to an embodiment of the invention, the diffuser is disposed between the reflector and the light source, and a drive mechanism configured to drive the diffuser to move or rotate is disposed at a side of the diffusion plate away from the reflector, so that the layout space of the reflector is increased, thereby increasing the design margin of the light source module. In addition, the diffusion plate is disposed at or near the focal point of the two lens elements, which helps scale down the size of the diffusion plate.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, comprising a light source, a first lens element, a reflector, a first diffuser, and a second lens element, wherein
    the light source is configured to emit a light beam;
    the first lens element is configured to focus the light beam on a first focal point;
    the reflector is disposed on a transmission path of the light beam, and the first lens element is located between the light source and the reflector;
    the first diffuser is disposed between the first lens element and the reflector, and the first diffuser comprises a first diffusion plate and a first drive mechanism, wherein
        the first diffusion plate is located at the first focal point or near the first focal point, wherein the light beam is transmitted to the reflector by the first diffusion plate; and
        the first drive mechanism is disposed between the first diffusion plate and the first lens element, and is configured to drive the first diffusion plate to move or rotate; and
    the second lens element is provided with a second focal point located at a light-incident side, wherein the reflector is located at the light-incident side, and the second focal point and the first focal point are positioned at a point of an optical axis of the first lens element.

2. The light source module according to claim 1, further comprising:
    a fixed diffuser, disposed at the first focal point or near the first focal point and spaced apart from the first diffusion plate.

3. The light source module according to claim 2, wherein the fixed diffuser is located between the first diffusion plate and the first lens element.

4. The light source module according to claim 2, wherein a gap between the first diffusion plate and the fixed diffuser is greater than or equal to 2 millimeters.

5. The light source module according to claim 1, wherein a distance between the first diffusion plate and the first focal point is less than or equal to 5 millimeters.

6. The light source module according to claim 1, further comprising:

a third lens element, disposed at a light exiting side of the second lens element, and configured to focus the light beam from the second lens element on a third focal point; and a fixed diffuser, disposed at the third focal point or near the third focal point.

7. The light source module according to claim 6, wherein a distance between the fixed diffuser and the third focal point is less than or equal to 5 millimeters.

8. The light source module according to claim 6, further comprising:

a second diffuser, disposed at a light exiting side of the third lens element, and comprising:

a second diffusion plate, located at the third focal point or near the third focal point and spaced apart from the fixed diffuser; and a second drive mechanism, configured to drive the second diffusion plate to move or rotate.

9. The light source module according to claim 8, wherein the fixed diffuser is located between the second diffusion plate and the third lens element.

10. The light source module according to claim 8, wherein a gap between the second diffusion plate and the fixed diffuser is greater than or equal to 2 millimeters.

11. The light source module according to claim 1, wherein the first drive mechanism of the first diffuser is configured to drive the first diffusion plate to rotate relative to a rotation axis.

12. The light source module according to claim 1, further comprising:

an adjusting mechanism, wherein the reflector is disposed at the adjusting mechanism, and the adjusting mechanism is configured to drive the reflector to rotate relative to at least one axis.

13. The light source module according to claim 12, wherein the adjusting mechanism is configured to drive the reflector to rotate relative to a first axis and a second axis, and an axial direction of the first axis is perpendicular to an axial direction of the second axis.

14. The light source module according to claim 12, wherein the adjusting mechanism is configured to drive the reflector to rotate relative to a first axis and a second axis, and the first axis intersects the second axis at the optical axis of the first lens element.

15. The light source module according to claim 1, further comprising:

an adjusting mechanism, wherein the reflector is disposed at the adjusting mechanism, and the adjusting mechanism is configured to drive the reflector to move along an axial direction of at least one axis.

* * * * *